July 22, 1952 W. W. PAGET 2,603,980
FLUID PUMP DRIVE
Original Filed July 25, 1942 3 Sheets-Sheet 1

INVENTOR:
Wm. W. Paget.
BY John F. Schmidt
ATTORNEY.

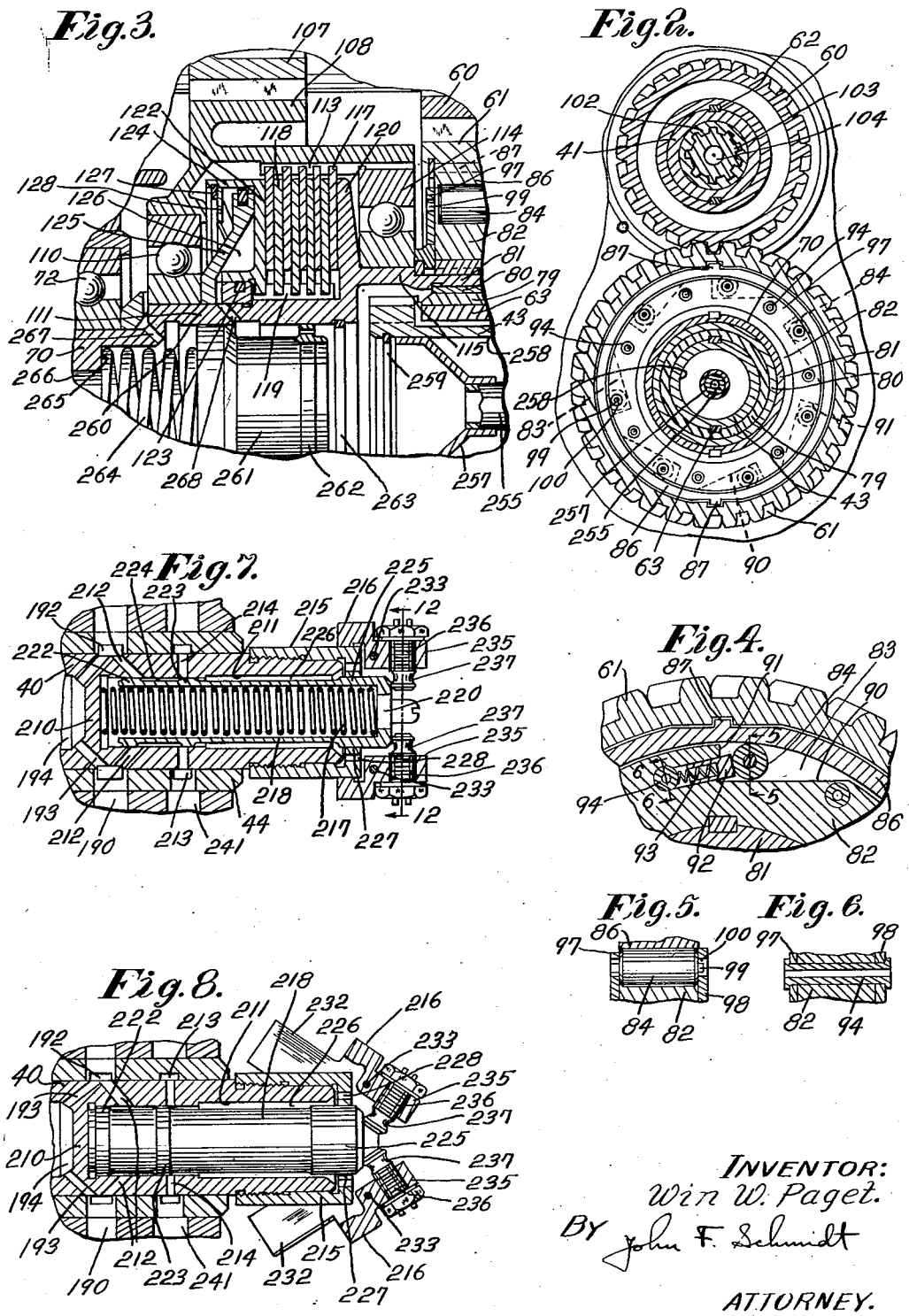

July 22, 1952 W. W. PAGET 2,603,980
FLUID PUMP DRIVE
Original Filed July 25, 1942 3 Sheets-Sheet 3
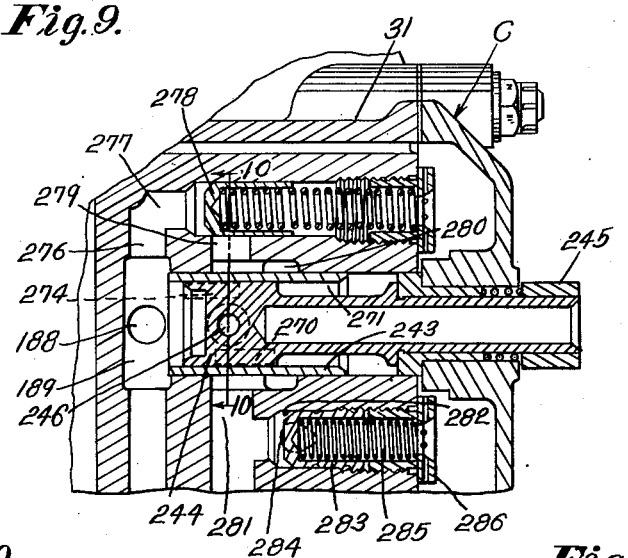
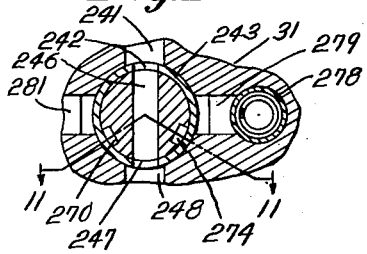
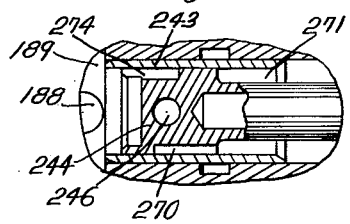
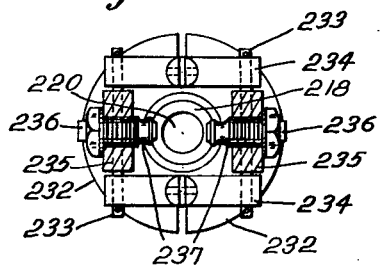
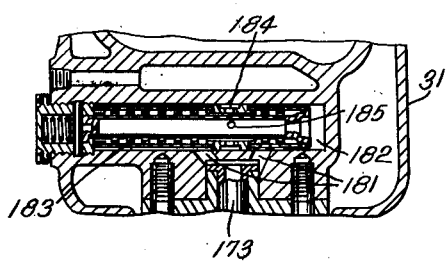
INVENTOR:
Wm W. Paget.
BY John F. Schmidt
ATTORNEY.

Patented July 22, 1952

2,603,980

UNITED STATES PATENT OFFICE 2,603,980

FLUID PUMP DRIVE

Win W. Paget, Michigan City, Ind., assignor to Joy Manufacturing Company, Pittsburgh, Pa., a corporation of Pennsylvania Original application July 25, 1942, Serial No. 452,299. Divided and this application March 11, 1949, Serial No. 80,844

8 Claims. (Cl. 74—364)

1

This invention relates to a fluid pump and drive therefor and is a division of Serial No. 452,299, filed July 25, 1942, now Patent 2,477,002, issued July 26, 1949.

The objects of this invention are included among the objects set forth in the above identified parent case, but may be summarized herein as the provision of a fluid pump and means for driving the same whereby an adequate speed of the fluid pump may be automatically obtained at all times, and whereby suitable manual controls may be superimposed on the automatic controls.

This and other objects are accomplished in a two-speed drive in which, with the power source rotating at a low speed, drive through the power transmission is accomplished at the higher speed ratio through a speed multiplication gear train, and whereby at the higher speed of the drive motor the drive is direct and therefore at a lower ratio.

In the drawings:

Fig. 2 is a view in section substantially on line 2—2 of Fig. 1.

Fig. 3 is an enlarged detail of a portion of Fig. 1, showing the clutch and associated mechanism on a larger scale.

Fig. 4 is an enlarged transverse fragmentary sectional view showing a detail of the drive mechanism.

Fig. 5 is a view in section on line 5—5 of Fig. 4.

Fig. 6 is a view in section on line 6—6 of Fig. 4.

Fig. 7 is an enlarged detail sectional view on the axis of the speed responsive device for controlling the pump speed.

Fig. 8 is a fragmentary view generally similar to Fig. 7, but with part shown in elevation and illustrating a different position of the parts.

Fig. 9 is a horizontal sectional view through the control mechanism at the right-hand end of the apparatus, being a view in section substantially on line 9—9 of Fig. 1.

Fig. 10 is a fragmentary vertical transverse section on line 10—10 of Fig. 9, showing a manually operable control valve positionable to vary the drive speed of the pump.

Fig. 11 is a view in section substantially on line 11—11 of Fig. 10.

Fig. 12 is a transverse vertical sectional view on line 12—12 of Fig. 7, and

Fig. 13 is a fragmentary enlarged horizontal sectional view on line 13—13 of Fig. 1, showing a detail of the hydraulic system.

Figure 1:
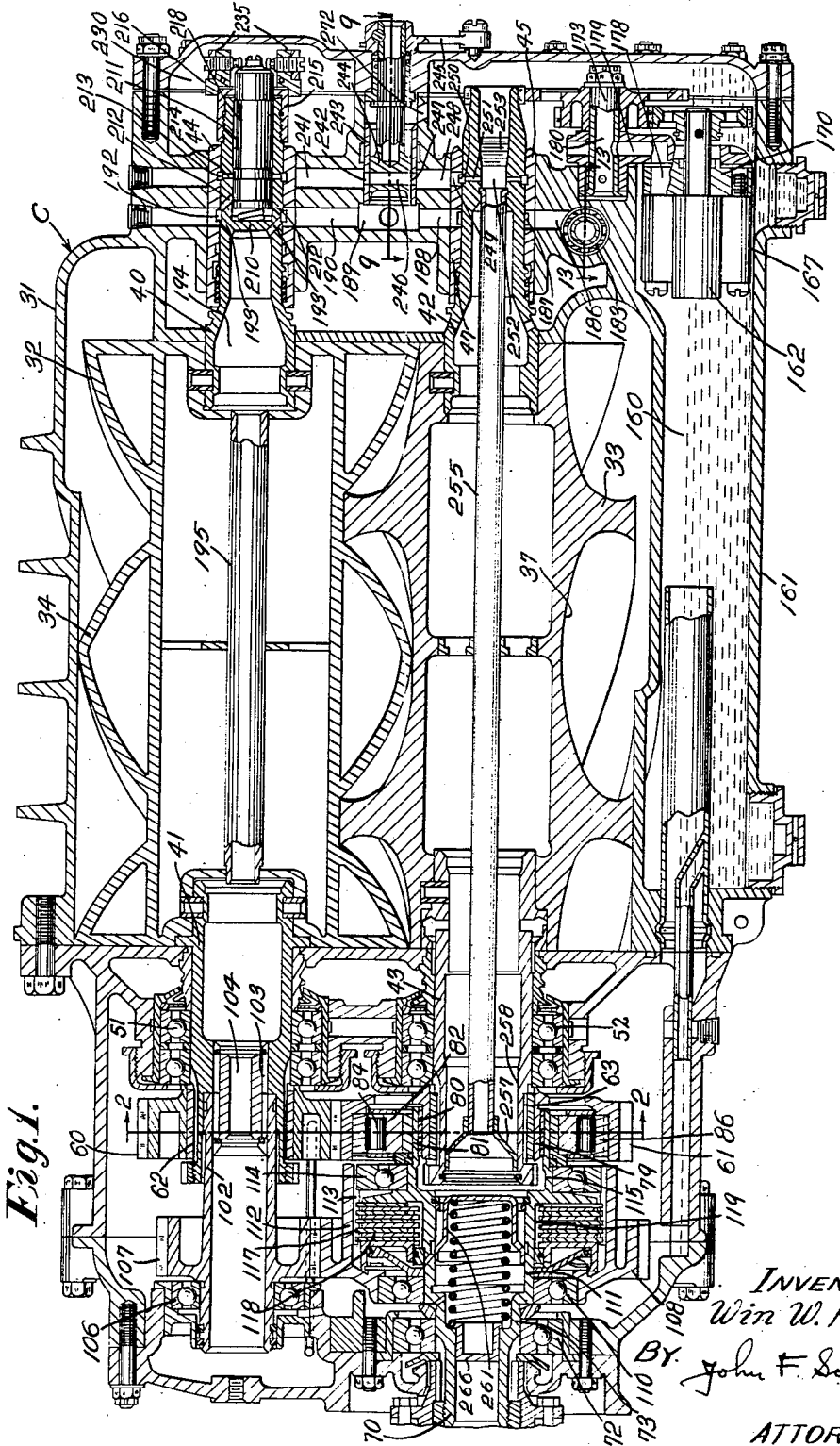
Fig. 1 is a longitudinal vertical sectional view substantially identical with Fig. 4 of the above identified parent application.

Where possible, the reference numerals used in this application correspond exactly to the reference numerals used in the parent case, in order to make cross-reference to that case easier.

In the preferred embodiment of the invention shown, the pumping apparatus, generally designated C, comprises a main casing part 31 and a pair of coacting rotors 32 and 33. The rotor 32 is a male rotor and comprises four helically arranged lobes 34. The female rotor 33 is provided, in the form shown, with six helically arranged grooves 37 each adapted to cooperate with the lobes of the rotor 32.

Each of the rotors 32, 33 is herein shown supported at its ends by stub shafts, the rotor 32 having a stub shaft 40 at its low pressure end and a stub shaft 41 at its high pressure end; while the rotor 33 has a stub shaft 42 at its low pressure end and a stub shaft 43 at its high pressure end. The stub shafts 40, 41, 42 and 43 are supported in suitable bearings 44, 51, 45 and 52 respectively, which position the rotors so that no contact can take place between them and the ends of the casing.

For the purpose of maintaining the rotors out of contact with each other they are connected by intermeshing helical gears 60 and 61, the gear 60 being splined, as at 62, to the stub shaft 41, and the gear 61 being splined, as at 63, to the stub shaft 43. The gears 60 and 61 are so formed that their helix angles correspond in hand and lead to the helix angles of the rotors to which they are respectively fixed.

A drive shaft 70 is arranged in alinement with the stub shaft 43 and has a driving connection therewith as will be described in detail below. The drive shaft is journaled by means of a ball bearing 72 engaging a cylindrical portion 73 on the drive shaft. Its other end is rotatably supported as later described. Surrounding a cylindrical hub portion 79 of the gear 61 is a bearing sleeve 80, and a cylindrical portion 81 at the right hand end of the drive shaft 70 rotatably surrounds the bearing sleeve and is journaled thereon.

Keyed to the periphery of the cylindrical portion 81 of the drive shaft is a member 82 having a number of recesses 83 formed therein receiving rollers 84 which are operative, as later described, at times to effect a clutching between the member 82 and a cylindrically bored liner ring 86 keyed, as at 87, to the gear 61. The recesses 83 have relatively straight base surfaces 90 and radial surfaces 91. Through the latter surfaces there project spring-pressed plungers 92 adapted to act upon the rollers 84 and cause them to connect the members 82 and 86 upon predetermined relative rotation between the latter members. Springs 93 act against cross pins 94 and move the plungers 92 against the rollers 84. The pins are supported in end closure or plate members 97 and 98, and the rollers have stems 99 loosely received in openings 100 in the plates 97 and 98. These plates 97 and 98 are supported to turn with the member 82.

It will be evident, referring to Figs. 2 and 4, that if the member 82 be driven counterclockwise it will, through the rollers 84, be connected to the liner ring 86 and through the latter drive the gear 61 and, by virtue of the connection of gear 61 to shaft 43, drive the rotor 33, while through the meshing of gear 61 with gear 60 and the mounting of gear 60 on shaft 41, rotor 32 will also be driven. If the gear 61 be driven counterclockwise at a greater angular rate than the member 82, it will not be connected to that member and may turn freely in the direction mentioned, relative to it.

It will be noted (Fig. 1) that the stub shaft 41 has another shaft 102 connected with it by means of a splined connector element 103 which has an axial bore 104. The lefthand end of shaft 102, as viewed in Fig. 1, is journaled in a ball bearing 106 and carries a gear 107 somewhat smaller than the gear 60. A gear 108, somewhat larger than the gear 61, meshes with the gear 107 and is journaled by a ball bearing 110 on a cylindrical portion 111 of the drive shaft 70. It also has a sleeve portion 112, internally splined at 113 and supported by a ball bearing 114 on a further cylindrical portion 115 of the drive shaft 70.

Discs 117 connected to the sleeve portion 112 are interleaved with other discs 118 connected by splines 119 to the drive shaft 70, which has a flange 120 adjacent the bearing 114 serving as an abutment for the end one of the interleaved series of discs 117, 118 when these are pressed together to connect the gear 108 to the drive shaft 70. A follower member 122 is slidably supported on a packing ring 123 mounted on the shaft 70 and has an annular outer sleeve portion 124 with whose bore a peripherally packed plate 125 coacts to form a chamber 126 for clutch-applying hydraulic pressure. A ring 127 seated in an internal groove in the sleeve portion 124 provides an abutment for a flexed annular spring 128 whose opposite side presses upon the side of the plate 125, and the spring 128 normally maintains the follower member 122 in clutch unloading position.

It may now be noted that when the clutch is loaded, the gear 108 will be connected directly to the shaft 70 and will drive the gear 107 and so the gears 60 and 61, and thus the rotors 32 and 33; and because the gear 61 will then be rotated faster than the member 82, and in the same direction with the latter, there will simply be an overrunning clutch action and no tendency for connection between gear 61 and member 82.

The compressor has automatic means for effecting change in the manner (and accordingly in the speed) of drive thereof governed by a speed responsive device and it has automatic means for effecting the initiation of compressive action thereby, governed by the pressure of the surrounding air. Both of these automatic means are hydraulically operated; the hydraulic clutch operating means for the compressor drive has been described above. The hydraulically controlled means for initiating compressive action is described in detail in the above-identified parent application of which this is a division and will not be described here because it is not a part of this invention.

As previously indicated, the change in speed of operation of the compressor and the loading and unloading are both hydraulically controlled, and I shall now describe the hydraulic system. There is provided in the base of the casing 31 the sump 160. This sump is disposed between the lower wall of the rotor housing and an outer wall 161 forming an integral part of the casing 31. The chamber is, in the horizontal position of the compressor, substantially horizontal, and a pump of the intermeshing gear type is positioned at the right-hand end of the casing as the same is viewed in Fig. 1, so that it is partially submerged and so that its intake is always submerged (in the horizontal position of the casing) in the oil in the sump.

This pump, designated 162, may be any suitable liquid pump. Reference may be had to the parent application for the details of a satisfactory pump, but this invention is not limited to such a pump. An intake passage in the under side 167 conducts oil into the pump. The pump discharge communicates with passages 178 in the cover 170, and 179 in a supplemental cover, and opens into the bore 180 of a sleeve member 173.

From this latter the fluid is discharged through branch passages 181 (Fig. 13) into a chamber 182 containing a strainer structure 183. Between the ends of the chamber 182 and suitably associated with the strainer is an annular peripheral member having a peripheral groove 184 to which the strained lubricant obtains access through radial ports 185. The annular groove 184 communicates with a passage 186 which opens into an annular groove 187 surrounding the bearing bushing 45. The opposite side of the annular groove 187 opens into a passage 188 whose upper end opens into a chamber 189. The chamber 189 constitutes a distribution point for oil for lubricating purposes and for operating the speed-changing clutch mechanism previously described and also for fluid to operate the air pressure controls described in detail in the parent case.

In line with the passage 188 there is another passage 190 opening outward and upward from the chamber 189. This communicates with an annular groove 192 in the bushing 44. The annular groove has continuously in communication with it obliquely disposed passages 193 opening into a chamber 194 in the stub shaft 40. The chamber 194, tube 195, and associated mechanism have to do with subject matter disclosed and claimed in the parent application, and will not be reviewed here.

It will be noted that in the stub shaft 40 there is, at the right hand end of the chamber 194, a partition 210 to the right of which there is a valve-receiving bore 211. Other obliquely extending passages 212 connect the annular groove 192 with the bore 211 at points near the partition 210, and a further annular passage 213 formed in the bushing 44 is connected with the interior of the bore 211 by radial passages 214.

Suitably supported on the rear end of the stub shaft 40 is a support or mounting 215 for a speed-responsive governor 216 which serves in conjunction with a spring 217 housed in the interior of a valve member 218, to vary the position of that valve member in the bore 211. The valve member will be observed to be open from end to end, as at 220, and to house the spring 217 within it in such a manner that the spring acts on the right-hand end of the valve in Fig. 7 at one end and at its other end acts on the partition or wall 210.

The valve has a left-hand end collar 222, another annular peripheral collar 223 spaced by a groove 224 from the collar 222 and a further enlarged collar—right-hand portion 225—spaced by a peripheral groove 226 of substantial length from the collar portion 223. The support member 215 has a portion 227 guidingly engaging the head 225 and is traversed by openings 228 so that in certain positions of the valve 218 there may be a discharge into a chamber 230 at the right hand end of the compressor, of fluid entering the chamber 211 through the radial passages 214.

The governor support 215 includes fly weights 232 pivotally supported on transverse pins 233 in earlike portions 234 carried by the support 215. Portions 235 of the fly weights at the opposite side of the pivots thereof from the main masses of said fly weights carry adjustable screw devices 236 which have heads 237 adapted to engage the end surface of the head 225, and upon the attainment of the shaft 40 to a predetermined speed of rotation the fly weights actuate the portions 235 to move the valve 218 to shift the valve from the position shown in Fig. 7 to that shown in Fig. 8, thereby allowing fluid entering the bore 211 through the radial passages 214 to be vented while at the same time preventing any delivery of fluid from the pump to the radial passages 214.

Cutting off the supply of fluid to the radial passages 214, and venting fluid from these passages through the bore 211 will effect, as shortly described, a reduction in the speed of the rotors. This reduction in speed, however, will not be sufficient to effect an operation of the speed governor permitting the valve to move again to a position for supplying fluid to the passages 214, as the design of the governor is such that it becomes operative to force the valve 218 to the left only upon the attainment of a speed as of the order of 7000 R. P. M., while after once assuming the position of Fig. 8 a reduction of the speed to a lower speed of the order of 4000 R. P. M. will be necessary before the weights will be moved in and permit the reestablishment of fluid delivery to the chamber 126 of the hydraulically operated clutch mechanism.

The circumferential groove 213 is connected below the stub shaft 40 with a passage 241 which extends downward parallel to the axis of the passage 190 and opens through an opening 242 into the interior of the bore of a valve-receiving bushing or sleeve 243. This valve-receiving bushing contains a rotatable valve 244, which is used primarily for testing purposes and which has an operating handle 245 by means of which the valve may be turned into any one of three different positions.

In the position of the valve 244 shown in Fig. 1, a diametric passage 246 connects the opening 242 with an opposite opening 247 in the valve sleeve and via the latter opening to the passage 248 which is connected through a port 249 in a bearing sleeve 47 and an annular groove 250 and radial passages 251 with a chamber 252 within the interior of the stub shaft 42. The outer end of this chamber 252 is closed by a plug 253, while the other end of the chamber 252 is connected by a suitably centered tube 255 with arrangements for effecting the operation of the clutch mechanism previously described and for the performance of certain lubricating functions.

Before proceeding with the description of this mechanism, it may be pointed out that below a predetermined speed of rotor 32, valve 218 will be in the position shown in Figs. 1 and 7 and will connect the pump discharge through the ports and passages previously described with the tube 255, but that, above such a predetermined speed, the valve 218 will assume the position shown in Fig. 8 and cut off communication completely between the passages 190 and 241 and vent 241 back to the sump through the chamber 230.

Now it will be observed, referring particularly to Figs. 1 and 3, that at the rear end of the tube 255 there is a bell or funnel shaped member 257 fitting the bore 258 of the stub shaft 43, and that a split spring ring 259 operates to prevent possible movement of the member 257 out of the bore in the stub shaft if any loosening should occur. Within a stepped bore 260 within the drive shaft 70 there is arranged a hollow plunger member 261 which is provided at one end with a perforated flange 262 adapted to seat against a split ring 263 secured within the inner wall of the drive shaft 70. The plunger member 261 is engaged by a spring 264 which reacts against a shoulder 265 within the drive shaft, and a thimble 266 closes the left hand end of the chamber within which the element 261 is movable. The interior of the chamber communicates, through obliquely radially extending passages 267, with the outside of the drive shaft between the ball bearings 72 and 110. Other radially obliquely extending passages 268 connect the interior of the stepped bore 260 at the right hand end of the plunger member 261 in communication with the chamber 126.

The mode of operation of the mechanism which has just been described is as follows: When the compressor is started, a driving connection is immediately established between the shaft 70 and the gear 61 and the pump 162 commences to deliver fluid through the strainer, through the passage 186, the chamber 189, the passage 190, the oblique passages 212, the annular groove 224, the radial passages 214, passages 241, 246, 248, 251 and the tubular conduit 255 to the interior of the member 257 and to the space between that member and the plunger member 261. The fluid immediately passes through the perforations in the flange 262 and through the radial passages 268 into the chamber 126 and brings the clutch discs 117 and 118 into contact with each other.

As the oil continues through the tube 255, the member 261 moves to the left, in effect increasing the volume of the conduit and compressing the spring 264; the compression of this spring is so determined that the clutch pressure will be gradually applied as the member 261 moves to the left. Just before member 261 reaches its extreme left-hand position, the resistance of spring 264 is such that the pressure in the hydraulic system is just below the value at which the relief valve opens. When member 261 reaches its extreme left-hand position, it can yield no further, whereupon the pressure in the hydraulic system immediately builds up to the value determined by the relief valve. The clutch discs are by then firmly pressed together and drive of the rotors at the higher speed by gear 108 will be effected. It will be appreciated that this high speed driving will be continued until the speed of the compressor builds up to such a degree that the valve 218 will be shifted by the governor, and then the slower speed drive between the shaft 70 and the compressor will be initiated. It will be noted that lubricant will be supplied from the space between the member 261 and the member 257 to the splines.

The manually operable valve 244 previously mentioned can be adjusted as previously described to such a position as to restore high speed drive of the compressor after such high speed drive has been automatically interrupted, or to prevent interruption of high speed drive upon the attainment of the predetermined speed of operation at which a shift to low speed drive is normally effected. Furthermore, in another position of adjustment, this valve may be so operated as to preclude the high speed drive completely.

It will be noted that in addition to the diametric passage 246 formed in the valve there is a longitudinal peripheral passage 270 which opens into the space 271 at the right hand side of the valve, a space which is connected by a passage 272 (Fig. 1) with the chamber 230 which communicates with the sump. When the valve 244 is turned to bring the passage 270 into communication with the passage 248 and to blank off the port 242 with the cylindrical portion of the valve opposite the groove 270, it will be evidently impossible to transmit pressure through the tube 255 for effecting high speed drive of the compressor.

The valve 244 also has an oppositely extending longitudinal peripheral groove 274 opening through its end which forms a portion of the bounding wall of the chamber 189. When the valve is turned so as to bring groove 274 into communication with the passage 248, fluid will be supplied from the chamber 189 continuously to the passage 248 and the tube 255 and high speed drive of the compressor will alone be possible. Fig. 1 shows means for locking the handle 245 of the valve 244 in mid position where the drive of the compressor is controlled by its speed automatically by the speed governor; the means comprises a recess in the end cover plate and a cooperating screw in the handle 245. Other similar recesses (not shown) are provided for the other two positions of the handle.

The chamber 189 has a laterally extending passage 276 communicating with the same. This passage is adapted to be connected by a longitudinally extending passage 277 under the control of a spring loaded valve 278 with a passage 279 opening into an annular chamber 280 which surrounds the sleeve 243 and which is connected at its opposite side with a passage 281. The function of the spring loaded valve 278 is to maintain a sufficient pressure in the chamber 189 under all circumstances when the compressor is running to insure the operation of the speed change mechanism.

The passage 281 has a bore 282 communicating with it, and a valve 283 reciprocates in the bore. A side vent 284 opens out of the bore and leads into the space 230, and a spring 285 having an adjustable follower 286 is adapted to control the pressure in the passage 281.

An extended summary of the mode of operation of the illustrative embodiment of the invention which has now been described in detail is not necessary in view of the explanations given of the modes of operation of the component parts. It may be noted, however, that when the compressor is caused to rotate, it will be started initially at the slower speed, drive being from the drive shaft 70 through the automatic roller clutch mechanism to the gear 61. As soon as the compressor has operated long enough to produce the necessary oil pressure in the system—a thing which occurs almost instantly—the high speed drive of the compressor rotors will be initiated unless the manual control valve 244 should have been moved to prevent this—an unlikely condition as this valve is used mainly for test purposes.

Obviously, if a substantial period of idling is desired prior to take off (assuming for illustration that the invention is applied to aircraft), this valve could be so manipulated as to prevent the needless displacement of air by the compressor. As soon as the compressor attains a certain predetermined driving speed, the automatic speed governor mechanism will shift the valve 218 to substitute the low speed drive for the high speed drive by interrupting the supply of clutch loading pressure to the friction clutch loading member 122. Thus during the relatively high speed operation of the compressor during flight the low speed drive will be in operation. The nature of the governor is such as to avoid hunting, and when the speed of the compressor is brought up to a value sufficient to initiate low speed drive there will be required a greater reduction in speed than will be occasioned by the change from one drive to the other before the compressor will again shift back to the high speed drive.

As a result of this invention it will be noted that a novel air pump or compressor is provided having novel control mechanism. It will further be evident that by the provision of the novel construction and arrangement of parts, an air pump or compressor is provided which is extremely compact and relatively light in weight. Other uses and advantages of the invention will be obvious to those skilled in the art.

While there is in this application specifically described one form which the invention may assume in practice, it will be understood that this form is shown for purposes of illustration and that the invention may be modified and embodied in various other forms without departing from its spirit or the scope of the appended claims.

I claim:

1. In a drive mechanism having a driving shaft and a driven shaft, one of said shafts having a hollow end providing an external surface and an internal bore, a first gear rotatably mounted on said external surface, a second gear mounted on the other shaft and keyed thereto, drive means connecting said first and second gears, an overrunning clutch connecting the hollow end of said one shaft with the second gear, a hydraulically operable clutch having elements connected to the hollow end of said one shaft and to the first gear, hydraulic means to engage the clutch, a source of hydraulic fluid under pressure, conduit means connecting said source with said hydraulic clutch-engaging means, the conduit means including said hollow end, a yieldable member in the hollow end portion of the conduit means and movable by hydraulic fluid pressure to increase the volume of the conduit means, and means acting on the yieldable member in a direction to oppose movement thereof by the fluid.

2. Drive mechanism as set forth in claim 1, in which the last-named means exerts a steadily increasing force as the yieldable member is displaced.

3. In a drive mechanism having a driving shaft and a driven shaft, one of said shafts having a hollow end providing an external surface and an internal bore, a first gear rotatably mounted on said external surface, a second gear mounted on the other shaft and keyed thereto, drive means connecting said first and second gears, an overrunning clutch connecting the hollow end of said one shaft with the second gear, a hydraulically operable clutch having elements connected to the hollow end of said one shaft and to the first gear, hydraulic means to engage the clutch, a source of hydraulic fluid under pressure, conduit means to deliver fluid under pressure from the source to said hydraulic clutch-engaging means, the conduit means including said hollow end, a fluid-movable member in the hollow end portion of the conduit means and yieldable under fluid pressure to permit enlargement of the conduit means, and means to limit movement of said member when the fluid in the conduit means is at such a pressure as to effect maximum engagement of the hydraulically operable clutch.

4. Drive mechanism as set forth in claim 3, and means opposing movement of the fluid-movable member, the opposition force exerted thereby increasing with movement of the movable member.

5. In a drive mechanism having a driving shaft and a driven shaft, one of said shafts having a hollow end providing an external surface and an internal bore, a first gear rotatably mounted on said external surface, a second gear mounted on the other shaft and keyed thereto, third and fourth gears meshing with said first and second gears respectively, a drive connection between the third and fourth gears, an overrunning clutch connecting the hollow end of said one shaft with the second gear, a hydraulically operable clutch having elements connected to the hollow end of said one shaft and to the first gear, hydraulic means to engage the clutch, a source of hydraulic fluid under pressure, conduit means connecting said source with said hydraulic clutch-engaging means, the conduit means including said hollow end, and a yieldable member in the hollow end portion of the conduit means and movable by hydraulic fluid pressure to increase the volume of the conduit means.

6. Drive mechanism as set forth in claim 5, and means opposing movement of the yieldable member, the opposition force exerted thereby increasing with movement of the yieldable member.

7. In a drive mechanism having a driving shaft and a driven shaft, said shafts being coaxially aligned and one of them having a hollow end providing an external surface and an internal bore, a first gear rotatably mounted on said external surface, a second gear mounted on the other shaft and keyed thereto, drive means connecting said first and second gears, an overrunning clutch connecting the hollow end of said one shaft with the second gear, a hydraulically operable clutch mounted on said hollow end and having elements connected to the hollow end and to the first gear, hydraulic means to engage the clutch, a source of hydraulic fluid under pressure, conduit means to connect said source with the hydraulic means to engage the clutch, the conduit means including said hollow end, and a yieldable member in the hollow end portion of the conduit means and reciprocable to increase the volume of the conduit means.

8. Drive mechanism according to claim 7, in which the first-named gear is provided with a sleeve portion which is spaced from said external surface to provide an annular space between the sleeve portion and said surface, the hydraulically operable clutch being disposed in the annular space.

WIN W. PAGET.

REFERENCES CITED

The following references are of record in the file of this patent:

UNITED STATES PATENTS

| Number | Name | Date |
| --- | --- | --- |
| 594,787 | Gallagher | Nov. 30, 1897 |
| 1,611,545 | Maybach | Dec. 12, 1926 |
| 1,938,780 | Nenninger et al. | Dec. 12, 1933 |
| 2,122,067 | Kress | June 28, 1938 |
| 2,183,761 | Aspinwall | Dec. 19, 1939 |
| 2,209,884 | Halford | July 30, 1940 |
| 2,282,591 | Orr | May 12, 1942 |
| 2,396,361 | Browne | Mar. 12, 1946 |
| 2,482,460 | Browne | Sept. 20, 1949 |

FOREIGN PATENTS

| Number | Country | Date |
| --- | --- | --- |
| 318,255 | Italy | July 7, 1934 |